United States Patent [19]

Hoffman et al.

[11] Patent Number: 4,971,537

[45] Date of Patent: Nov. 20, 1990

[54] APPARATUS FOR PUTTYING ELONGATED PLYWOOD BOARDS

[75] Inventors: Harry O. Hoffman, 4411 Yakata Doro Dr., Youngstown, Ohio 44511; James E. Kalbes, Mineral Ridge; Steve P. Zarnosky, Columbiana, both of Ohio

[73] Assignees: Harry O. Hoffman; Kathleen A. Hoffman, both of Youngstown, Ohio

[21] Appl. No.: 372,770

[22] Filed: Jun. 29, 1989

[51] Int. Cl.[5] ........................ B29C 39/10; B29C 39/20

[52] U.S. Cl. ........................................ 425/13; 118/669; 118/670; 118/100; 118/300; 156/94; 425/110; 425/145

[58] Field of Search .................. 156/94, 94 X; 264/36, 264/259; 425/13, 145, 110; 118/670, 407, 410, 669, 110, 670, 300, 411, 407, 50

[56] References Cited

U.S. PATENT DOCUMENTS

| | | | |
|---|---|---|---|
| 2,860,597 | 11/1958 | Works et al. | 156/94 |
| 3,362,379 | 1/1968 | Knudtson | 118/670 |
| 3,941,529 | 3/1976 | Klingebiel | 425/4 R |
| 4,067,673 | 1/1978 | Hendry | 425/4 R |

*Primary Examiner*—Willard Hoag
*Attorney, Agent, or Firm*—Clifford A. Poff

[57] ABSTRACT

An automated machine for continuously puttying the side edges of a plurality of elongated plywood boards is disclosed. The device includes a laterally adjustable conveyor system for accommodating boards of various widths. Also included are a pair of opposed putty applicator heads for simultaneously applying putty under pressure to both side edges of the plywood boards as the boards pass thereby. Excess putty striking or wiping devices are included for wiping excess putty from the side edges of the boards which is applied by the putty applicator heads. The machine quickly, efficiently and completely putties the side edges of large numbers of plywood boards rapidly and continuously in a mass production operation.

24 Claims, 4 Drawing Sheets

APPARATUS FOR PUTTYING ELONGATED PLYWOOD BOARDS

This application is related to copending U.S. Patent Application Ser. No. 324,611 filed Mar. 17, 1989 and has a common assignee therewith.

BACKGROUND OF THE INVENTION

1. Field of the Invention: The present invention relates to puttying apparatus, in general, and to an automated device for puttying the edge portions of large numbers of elongated plywood boards, in particular.

2. Description of the Prior Art: The most common tool known for applying putty to a surface is a manually operated putty knife. Such a device is used to spread putty over a surface to be treated in order to fill gaps, cracks, etc. in the surface. Such a device is adequate for small-scale jobs such as filling a relatively small number of surface irregularities which may be present in a surface of limited size. However, such a device is of little use when it is desired to quickly and efficiently putty large surface irregularities which may be present in a mass production environment involving large numbers of surfaces which need to be quickly and continuously treated. The use of a hand-held putty knife in such a mass production operation would not only reduce the operation to a virtual standstill, the consistency and thickness with which the putty is applied to the surfaces could not be uniformly controlled, even if applied by a highly-skilled laborer.

An advantage exists, therefore, for an automated device which can quickly, efficiently, and uniformly apply putty to large numbers of surfaces which need to be quickly and continuously treated, i.e., in a mass production operation.

It is therefore an object of the invention to provide an automated puttying device for filling surface irregularities in large numbers of surfaces in a rapid and continuous manner.

It is a further object of the invention to provide an automated puttying device for applying a uniform and controlled thickness of putty to large numbers of surfaces in a rapid and continuous manner.

It is a further object to provide a device for puttying the side edges of elongated plywood boards such that when the boards are further treated, i.e., by sanding and painting, the boards will have the appearance of unstratified solid wood boards.

Still other objects and advantages will become apparent when one considers the attached drawings and the description of the invention presented hereinbelow.

SUMMARY OF THE INVENTION

To overcome the problems associated with quickly, efficiently and uniformly applying putty to large numbers of voids, cracks and other surface irregularities which may be present in surfaces which are to be quickly and continuously treated, there is provided an adjustable and virtually continuously operable automated putty machine. The putty machine of the present invention is particularly well suited to continuously puttying the side edges of elongated objects such as boards, and most particularly plywood boards since plywood boards contain large numbers of gaps, voids and other surface irregularities in the side edges of the laminae which form the boards. The machine includes a conveyor system for continuously transporting the plywood boards to be treated to spaced opposed putty applicator heads on either side of the conveyor. The conveyor has a frame which is adjustable in width to accommodate boards of varying width. The spaced opposed putty applicator heads then continuously apply putty under pressure to the side edges of the boards to fill the gaps and other voids in the side edges. The boards are then transported continuously by the conveyor from the putty applicator heads to a putty striking station formed of spaced opposed wiping means. The wiping means smooth the putty applied to the side edges of the boards to a uniform, controllable and consistent thickness and remove excess putty which may have been applied to the side edges of the boards by the putty applicator heads. The thus-treated boards are then transported by the conveyor from the putty striking station to a location whereby they can be removed from the conveyor.

DESCRIPTION OF THE PREFERRED EMBODIMENT

The puttying apparatus of the present invention is used for treating plywood boards such that after subsequent treatment, i.e., sanding and painting, the boards will give the appearance of unstratified, solid wood boards. When so processed, the boards will have particular advantageous use as an exterior wood trim product for domestic structures or homes. The trim boards can be placed around doors, windows, wall sections, overhangs, soffits, etc. mostly for accent or to give a "finishing touch" to the homes.

An example of a type of plywood used for such trim boards and one which is adaptable for treatment by the puttying apparatus of the present invention is a base plywood product generally similar to a type already on the market for other industrial uses, howbeit not for a trim product, such as manufactured and sold by Simpson Timber Company of Shelton, Washington and marketed under the registered Trademark "Two Step" MDO, MDO being an acronym for a plywood base panel having a medium density overlay on one or both of its planar surfaces and employing a marine plywood type adhesive. A discussion of this product can be found in this Company's brochure, Form No. B360F/Revised May 1988/4000. The term density refers to the amount of resin in the overlay, the resin being used for proper coating adhesives for its high capacity for moisture resistance.

One of the important aspects of the invention is to provide an apparatus for developing the above described cut MDO product into a trim that will give the appearance of a solid wood board, in which the longitudinal edges in particular are made to look like solid wood and both the overlay surface and the longitudinal edges when painted or stained will give the appearance of three identical exposed surfaces, which will be far superior from a maintenance standpoint than existing trim products for a wide range of different outdoor regions and conditions.

Figure 1:
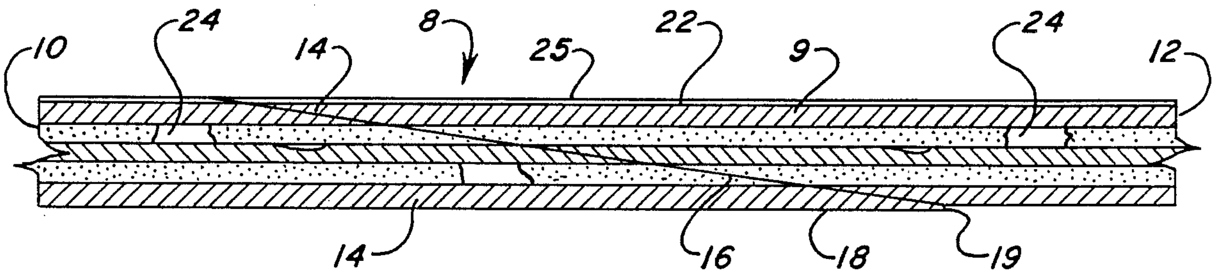
FIG. 1 is a view of an unputtied side edge of a plywood board.

With reference now to FIG. 1, which is the first of three sequential views of a portion of one of the longitudinal sides or edge surfaces of a 5 ply Douglas fir multistep scarf jointed thin core MDO plywood trim board of the type described above before the side has been treated in accordance with the teaching of the present invention.

While the description of the plywood board for receiving treatment by the puttying apparatus of the present invention is mainly disclosed as being an elongated plywood board formed as two or even more similar boards joined endwise by a scarfed joint, it should be understood that single, or unspliced, plywood boards are equally receptive to treatment by the puttying apparatus of the present invention.

Again back to FIG. 1, the illustrated trim board 8, as viewed from one of its edge surfaces 9, is comprised of two end-to-end boards 10 and 12 constructed according to customary practice of five plies 14, the left hand board 10 being joined to the right hand board 12 by a well known scarfed joint 16, in a manner that any thickness differential is made to appear all at the lower surface 18, at the location 19, which will be the non exposed i.e. construction side of the finished trim. The thickness difference between the two joined products in the area of the joined ends being limited to no more than approximately plus or minus one thirty second of an inch. As noted previously, and as those skilled in the art will appreciate, the trim need not be made up of two or more boards and that if joined, the joint need not be a scarfed joint, but a figured or other type of joint can be employed.

To the top surface 25 of the board 8 there is formed the medium density overlay 22 of the type previously discussed. Also shown in FIG. 1 are several of the customary edge imperfections in the form of irregular openings 24 which may range in depth or extent from a mere surface indentation to a opening clear through the board. Not shown, is the full extent of the core gaps which exist between each adjacent surface or layer of the plies 14, which gaps require treatment as do the openings 24. Such gaps and openings, as will be described hereafter, are completely and uniformly filled by the puttying apparatus of the present invention, thus fully realizing the objectives of the invention.

Figure 2:
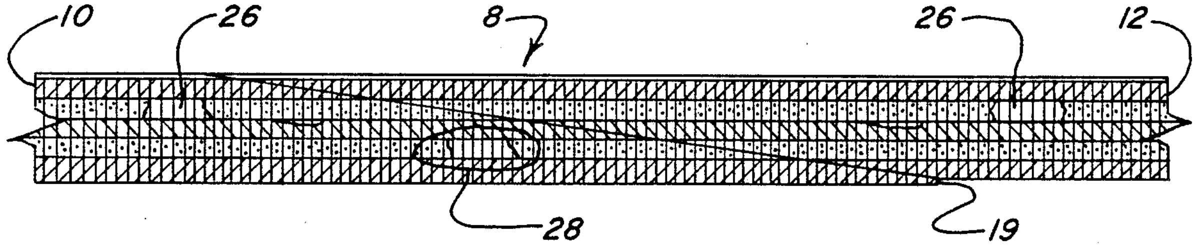
FIG. 2 is a view of the side edge of the board of FIG. 1 after putty has been applied thereto.

Turning now to FIG. 2, where like references indicate similar elements, as is true in the remaining views, this sequential view is designed to depict the improved condition of the edges of the trim board after it has been treated with a void filling substance or putty 26. In the preferred form of the invention, the filler substance takes the form of a water base wood putty similar the 120 spackling paste sold by the Synkoloid Company, Inc. of Atlanta, Georgia under its trade name "SYNKO". The technique employed to effectively apply the filler and how the filler holds up after drying and cooling are important factors in selecting the filler. Some fillers were found to not fill the voids satisfactorily, particularly when applied to a vertical surface, others were applied in an acceptable manner but upon drying formed "dimples" or "mud cracks". The putty found most acceptable was one that contained relatively high solids, for example approximately 70% solids in which the solids consisted substantially of resins but yet had the necessary viscosity for effective application and flexibility-resiliency when dried. Because of the need to balance these various factors it was found that the maintenance of the temperature of the putty was important. In this regard it is desirable that the putty be maintained at a temperature so as not to fall below approximately 60° F. and preferably that it be maintained at a "room temperature" range approximately between 60 and 80° F. Depending on the type and contents of the putty, the condition of the edges of the plywood boards to be puttied, and the ambient conditions of the manufacturing plant, the desired viscosity of the putty may vary substantially.

FIG. 2 is designed to indicate that the putty has completely filled any and all openings, including the core gaps and the scarfed joint, wherein the entire surface, in addition to the openings and gaps, is covered with coating of the putty. In this covering and filling it will not be necessary to completely fill the extensive openings and only necessary to provide enough filling to assure a smooth flat edge surface. After the application of the putty such openings, however, may have an overage of putty tending to protrude outwardly from the other portions of the covered edge surface, this condition being depicted by the area marked 28.

Figure 3:
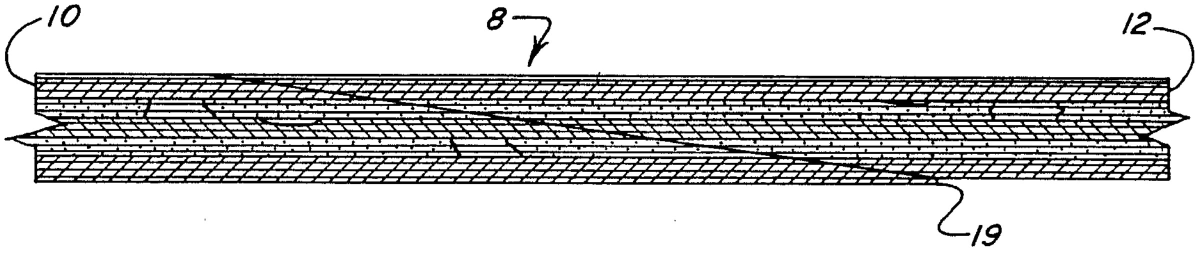
FIG. 3 is a view of the puttied side edge after excess putty has been wiped therefrom.

In addition to a putty filler which could be either a water or solvent base product, depending on the weather conditions with which the board is to be used, the machinery employed to apply the filler and commercial considerations, the filler may be one of several available caulking compounds, or one of the wood filler products now on the market that can be altered, if necessary, to fit the particular purpose. In the third sequential view shown in FIG. 3, the putty treated edge of the board 8 has been given a smoothing or striking treatment such as by wiping, the preferred treatment being one in which both opposite edge surfaces of the board are subject to a wiping operation such as by spaced opposed wiping means as will be described in greater detail hereinbelow. Such a covering/gap-filling treatment followed by the wiping treatment thus provides a relatively thin and uniform coating of the putty on the side edges of the board which virtually eliminates the striated appearance at the edge of board created by the laminae that form the board.

Figure 4:
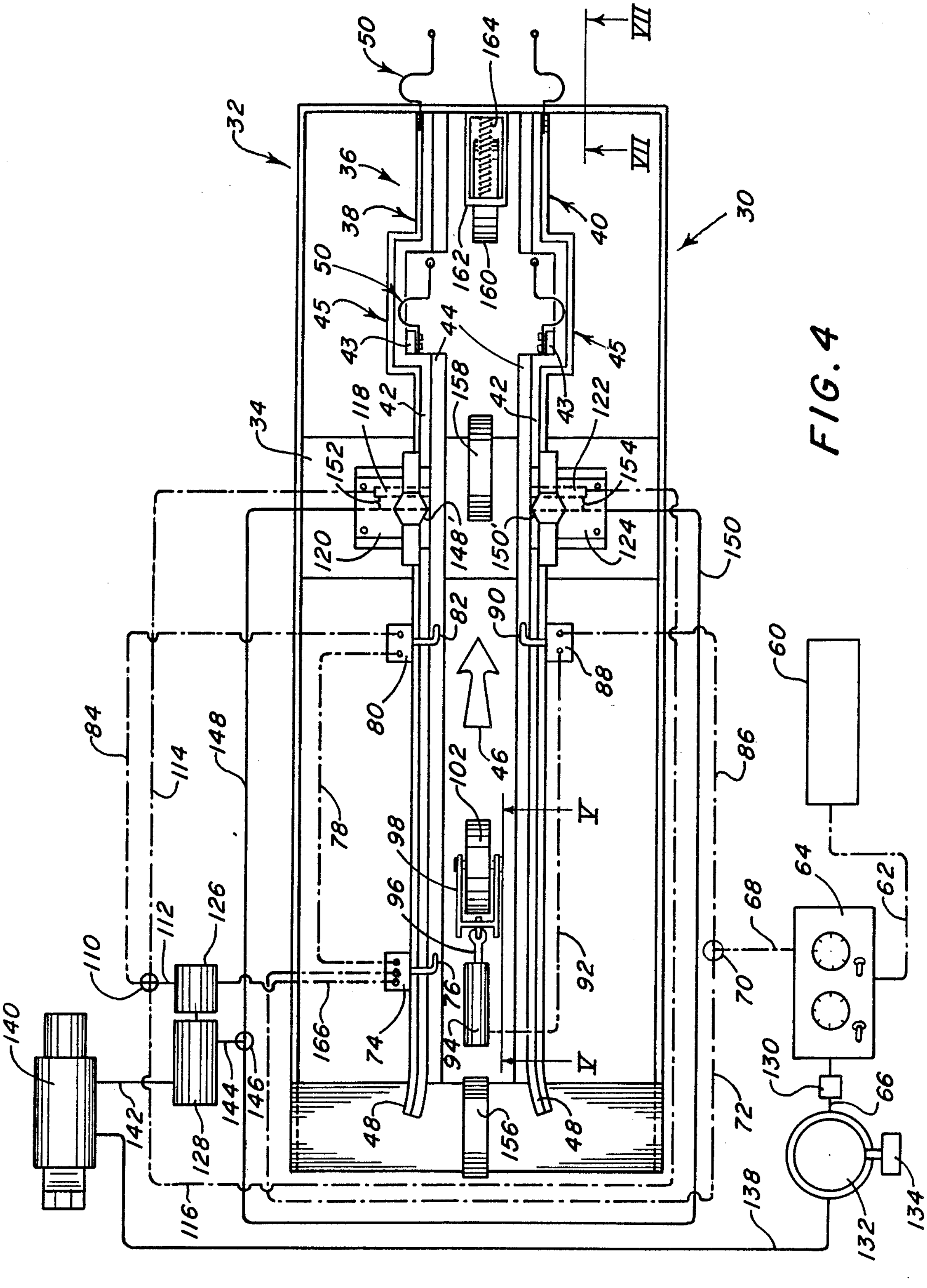
FIG. 4 is a schematic view of the pneumatic and putty supply systems of the automated putty machine of the present invention.

Referring now to FIG. 4 there is shown an automated putty applicator apparatus or, generally, putty machine 30, constructed in accordance with the preferred embodiment of the present invention.

Putty machine 30 includes, inter alia, a main frame 32 and putty catch pan 34 supported by the frame 32 for catching excess putty applied by spaced opposed putty heads, to be described later, which apply putty simultaneously to opposite side edges of workpieces such as plywood boards passing thereby. The frame 32 further has a longitudinally extending workpiece guide frame 36 supported thereon. Workpiece guide frame 36, as will be described herebelow, is laterally adjustable to accommodate various widths of boards which may pass through the putty machine. Workpiece guide frame 36 includes parallel laterally-spaced workpiece guide members 38 and 40. Each guide member 38 and 40 includes a substantially vertical rail portion 42 having a substantially horizontal workpiece support portion 44 secured to the lower edge thereof. Rail portion 42 and support portion 44 of each of the workpiece guide members 38 and 40 serve to support and guide a workpiece or board as it passes through the putty machine 30.

A board passes through the putty machine in the direction of arrow 46 shown in FIG. 4. At the workpiece entrance portion of the guide frame 36, the guide members 38 and 40 are each flared outwardly, as shown at 48, to aid the operator in placing and aligning the board in the guide frame 36. At the workpiece exit portion of the guide frame 36, each of the workpiece guide members has secured thereto excess putty striking means 50 which will later be described in greater detail.

Also shown in FIG. 4 are the pneumatic and putty supply systems of the putty machine 30. The lines connecting the various elements of the pneumatic system are depicted in dot-dash lines and the lines connecting the various elements of the putty supply system are depicted in solid lines.

The pneumatic system of the putty machine 30 is provided with a compressor 60 as a source of pressurized air. Pressurized air passes from compressor 60 through pressurized air supply line 62 at approximately 120 psi to a pneumatic system control center 64. Control center 64 has appropriate switches for activating and deactivating the pneumatic and/or the putty supply systems as well as gauges for indicating the outgoing pressures fed to those systems. Pneumatic pressure is transmitted out of control center 64 through unregulated pneumatic supply line 68 and, as will be discussed later, regulated pneumatic supply line 66.

As noted above, the pneumatic supply line 68 is an unregulated supply line. It therefore transmits pressurized air at the same pressure as pressurized air supply line 62, i.e., at approximately 120 psi. Pneumatic supply line 68 leads to a "T" coupling 70 which diverts the pressurized air carried by line 68 to lines 72 and 86, respectively. Line 72, in turn, leads to a first limit switch or board sensor 74 which is mounted to guide member 38. When an operator has activated the putty supply and the pneumatic systems at control center 64, the operator then proceeds to feed boards into the flared entrance portion of the guide frame 36 so that the side edges of the board "B" may become coated by the putty machine 30. The front end of a board which is inserted into the guide frame 36 first contacts and lifts the switch arm 76 of the first limit switch 74. Lifting of the switch arm 76 triggers limit switch 74 to feed pressurized air therefrom to a line 78 whose opposite end is connected with a second limit switch or board sensor 80 which is also mounted to guide member 38. As a board travels further through guide frame 36 it then contacts and lifts the switch arm 82 of the second limit switch 80. Lifting of the switch arm 82 triggers limit switch 80 to feed pressurized air therefrom to line 84 which leads to a coupling 110 to be described later. It is to be appreciated that the boards which are to be puttied are of sufficient length to lift both of the switch arms 76 and 82 during passage of the boards through the guide frame 36.

Mounted to guide member 40 in direct alignment with the second limit switch 80 is a third limit switch or board sensor 88 having a switch arm 90. By being in direct alignment with the second limit switch 80, the third limit switch 88 is triggered simultaneously therewith. Thus, a board passing through guide frame 36 simultaneously contacts and lifts switch arms 82 and 90 of second and third limit switches 80 and 88, respectively.

Upon the lifting of switch arm 90 by a moving board, the switch arm 90 then triggers switch 88 to feed pressurized air therefrom to line 92 which leads to a pneumatic cylinder 94. Pneumatic cylinder 94 is mounted through suitable frame members 93 (FIG. 5) to frame 32. The pneumatic cylinder 94 is part of a workpiece hold-down/conveyor system whose general structure is best illustrated in FIG. 5.

Figure 5:
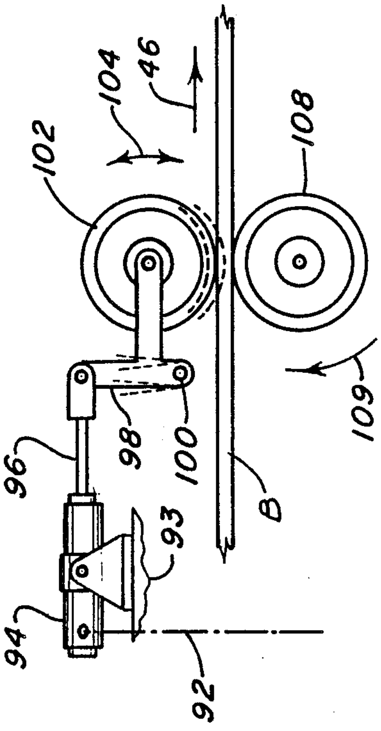
FIG. 5 is a view of a portion of the workpiece conveyor system of the putty machine as seen along line V—V of FIG. 4.

As can be seen in FIG. 5, line 92 leads to pneumatic cylinder 94. A piston rod 96 extending from cylinder 94 is pivotally connected at a forwardmost end thereof to an upper portion of a wheel frame 98. Directly beneath the pivotal connection between the piston rod 96 and the wheel frame 98 the latter is pivotally supported on pivot pin 100, which in turn is connected to frame 32 by suitable means (not shown). Forwardly and freely rotatably supported in wheel frame 98 is hold-down wheel 102. Therefore, extension or retraction of piston rod 96 by cylinder 94 causes wheel frame 98 to pivot about pivot pin 100 to raise or lower hold-down wheel 102 in opposite vertical directions as indicated by double headed arrow 104.

Directly beneath and vertically aligned with hold-down wheel 102 is a drive wheel 108. In operation, drive wheel 108 is driven by suitable drive means to rotate in the direction of arrow 109. A brief description of the hold-down/conveyor system of FIG. 5 is as follows. When a board "B" contacts and lifts switch arm 90 of limit switch 88, limit switch 88 directs pressurized air to be fed to line 92. Pressurized air from line 92 pressurizes pneumatic cylinder 94 which then causes piston rod 96 to be extended therefrom. Piston rod 96 then pivots wheel frame 98 in a clockwise fashion about pivot pin 100 to force the hold-down wheel 102 into contact with the upper surface of board "B". Piston rod 96 continues to extend to force the hold-down wheel downwardly until the lower surface of board "B" comes into contact with forwardly rotating drive wheel 108. The board "B", now held in positive contact with drive wheel 108 through the force exerted on hold-down wheel 102 by cylinder 94, is caused to be driven in a forward direction by drive wheel 108 through guide frame 36 as indicated by arrow 46. Thus, force exerted by the hold-down wheel 102 acts not only as a hold-down for the board "B" for stabilizing the board as it passes through the guide frame, but it also acts to maintain positive engagement between the board and the drive wheel 108 so that the drive wheel will smoothly and continuously convey the board through the guide frame, even in the event the board may be somewhat warped along its length.

Referring back to FIG. 4, and as noted previously, when the switch arm 82 of the second limit switch is lifted by contact with a board "B" passing thereunder, the switch arm 82 triggers the switch 80 to feed pressurized air therefrom to line 84 which leads to a four-way coupling 110. Four way coupling 110 then directs the pressurized air to pass through lines 112, 114 and 116. Pressurized air passing through line 112 actuates a pneumatic valve 126 which communicates with and actuates a putty supply on/off valve 128. Operation of pneumatic valve 126 and putty supply on/off valve 128 will be discussed in more detail hereinafter.

Pressurized air in line 114 communicates with a small volume putty diaphragm 118 housed within a putty applicator head 120. Putty applicator head 120, like limit switches 74 and 80, is secured to guides member 38. Similarly, pressurized air in line 116 communicates with a small volume putty diaphragm 122 housed within a putty applicator head 124. Putty applicator head 124 is secured to guide member 40 in direct opposition to putty applicator head 120. Operation of the putty applicator heads 120 and 124, as well as putty diaphragms 118 and 122, will be described in more detail hereinbelow.

As previously noted, pressurized air passes from compressor 60 through pressurized air supply line 62 to the pneumatic system control center 64. Leading from control center 64 is a regulated pneumatic supply line 66. The initial 120 psi pressure fed into line 66 is reduced under "room temperature" conditions, to approximately 16.5 psi by an adjustable pressure regulator 130. The 16.5 psi regulated pressure in line 66 is then used to drive a reciprocating, pneumatically-operated putty pump 132 which draws putty from a putty reservoir 134. A preferred putty pump for use in the system of the present invention is a reciprocating, pneumatically-operated putty pump manufactured by GRACO, Inc. of Minneapolis, Minnesota, and listed under catalogue Model No. 225-951. A reciprocating pump was specifically chosen for the preferred embodiment of the present invention because it was discovered that the service life of such a pump, for the purpose of the present invention, was much greater than that of a conventional gear pump. With experimentation and observation it was found that the abrasiveness of the putty material being pumped quickly reduced the effectiveness of and, in a short period of time, rendered a conventional gear pump virtually useless.

Putty pump 132 is a 24:1 ratio pump, i.e., the input pressure received from line 66 is converted to a putty supply line pressure of twenty-four times the input pressure. It is to be understood that the regulated pressure of 16.5 psi is merely illustrative of a typical pressure which may be used to operate the pump 132. However, the regulated pressure required to cause the pump 132 to efficiently pump the putty from the reservoir may be greater or lesser than 16.5 psi depending on the temperature of the putty within the reservoir 134. For example, if the putty temperature is relatively low, the putty will be relatively high in viscosity and the regulated putty pressure in line 66 will accordingly have to be raised above 16.5 psi in order to cause the pump 132 to pump the putty. Conversely, if the putty temperature is relatively high the putty will be relatively low in viscosity, and the pump can be operated by a regulated pressure in line 66 of less than 16.5 psi. In extremely cold ambient temperature conditions sometimes experienced in winter, an electric heating jacket may be placed around the putty reservoir 134 to reduce the viscosity of the putty contained therein so that it can be pumped relatively easily by the pump 132. Maintenance of a regulated pressure of approximately 16.5 psi in line 66 is preferred, however, since it has been discovered that a pump-converted putty supply line pressure of approximately 400 psi exiting pump 132 most efficiently and effectively applies putty to the sides of boards "B" through putty applicator heads 120 and 124.

The putty drawn from reservoir 134 by pump 132 is then fed through putty supply line 138 to a putty or mastic regulator or accumulator 140. A preferred accumulator for use in the system of the present invention is a high pressure accumulator also manufactured by GRACO, Inc. and listed under catalogue Model No. 903-958. Reciprocating pumps such as pump 132 are notorious for providing unequal pressures and material flow rates on their upward and downward strokes. One stroke, usually the upward stroke, provides less flow than the other stroke. Therefore, the reason for providing accumulator 140 in the putty supply line 138 is to provide an equalized pressure and flow rate downstream of the accumulator to produce a constant putty flow rate through the putty applicator heads 120 and 124 on each stroke of reciprocating pump 132. Also, a further advantage of providing the accumulator 140 is that it accumulates putty therewithin such that in case of temporary hesitation in pump 132, the putty supply system can maintain continuous flow through the putty heads using the volume of putty stored in the accumulator 140.

When pneumatic valve 126 receives pressurized air from line 112, as described above, it communicates with putty supply on/off valve 128 to open that valve. Upon opening of valve 128, pressurized putty is permitted to flow from accumulator 140 through line 142, through valve 128, and through line 144 to "T" coupling 146. From coupling 146 the pressurized putty is diverted through putty head supply lines 148 and 150. The putty head supply lines 148 and 150 pass through putty applicator heads 120 and 124, respectively, and terminate at discharge ports 148' and 150' of the putty applicator heads which virtually contact the side edges of the boards "B" as the boards pass thereby. In operation, as the boards pass by the putty applicator heads 120 and 124, the heads inject putty under pressure through discharge ports 148' and 150' into all of the gaps, voids, cracks, etc. occurring in the side edges of the boards in order to fill those voids. In some instances, however, a particular gap or crack to be filled is excessively large and the quantity of pressurized putty fed through a respective putty applicator head discharge port 148' or 150' is not enough to fill the "oversized" void in the side edge of the board as the board passes thereby. In such an instance, a portion of the volume of putty contained in either small volume putty diaphragm 118 or 122 is injected under pressure supplied by pressurized pneumatic line 114 or 116 connected thereto in order to completely fill the remainder of the "oversized" void not filled by either putty head supply line 148 or 150. Under normal operation, the putty applicator heads 120 and 124 are in contact with the side edges of the boards "B". Therefore, a back pressure is created in putty head supply lines 148 and 150 as putty is pumped therethrough. Such back pressure causes a small portion of the putty pumped therethrough to pass through lines 152 and 154 which communicate with the interior volumes of small volume putty diaphragms 118 and 122, respectively, in order to refill those diaphragms between times in which the putty volumes contained therein are spent in filling the "oversized" voids in the sides of the boards described above. Thus, the putty head supply lines 148 and 150 in combination with the small volume putty diaphragms 118 and 122 serve as primary and secondary systems for completely filling any and all voids which occur in the sides of the plywood boards "B".

Also shown in FIG. 4 are first and second board hold-downs 156 and 158 which, along with hold-down wheel 102, serve to stabilize a board as it passes through putty machine 30. Hold-downs 156 and 158 further serve to maintain positive contact between the board to be treated and the previously-discussed drive wheel 108. It is preferred that for purposes of cost-efficiency and simplicity, first and second hold-downs 156 and 158 are simple leaf spring members appropriately secured to frame 32 by suitable means (not shown). However, it is contemplated that more sophisticated hold-downs may be used in place of leaf spring members 156 and 158 if such are necessary or desired. A second hold-down wheel 160 is also illustrated in FIG. 4. This hold-down wheel maintains positive contact between a board and a second drive wheel 108' (FIG. 6) as the board exits putty machine 30. Second hold-down wheel 160 is freely rotatably supported in spring-biased wheel frame 162 which is secured to machine frame 32. Wheel frame 162 is downwardly biased by a compression spring 164. The structure of spring-biased hold-down wheel 162 can be replaced with more sophisticated structure such as the pneumatic cylinder system associated with the first hold-down wheel 102 if so desired or with structure as simple as leaf springs 156 and 158 if so desired.

A further feature of the present invention is the provision of a pneumatic line for keeping pneumatic valve 126 and, hence, putty supply on/off valve 128 open during times in which the end of a board has passed beyond the first limit switch 74. At such times, the switch arm 76 closes and pneumatic pressure is prohibited from passing through line 78 to second limit switch 80. Such a situation would appear to cut off pneumatic pressure to pneumatic valve 126 which keeps the putty supply on/off valve open. However, when switch arm 76 swings downwardly, this opens "normally closed" pneumatic line 166 leading from first limit switch 74 to pneumatic valve 126. Therefore, pneumatic pressure is directed from line 72, through limit switch 74, through line 166, and then to pneumatic valve 126 in order to keep putty supply on/off valve 128 open at times when no pneumatic pressure is transmitted to pneumatic valve 126 from second limit switch 80. It is to be appreciated that when limit switch 74 opens line 78 it closes line 166, and vice versa. By such a construction, putty is continuously applied under pressure to the full length of the side edges of the boards as they pass through the putty machine 30.

Figure 6:
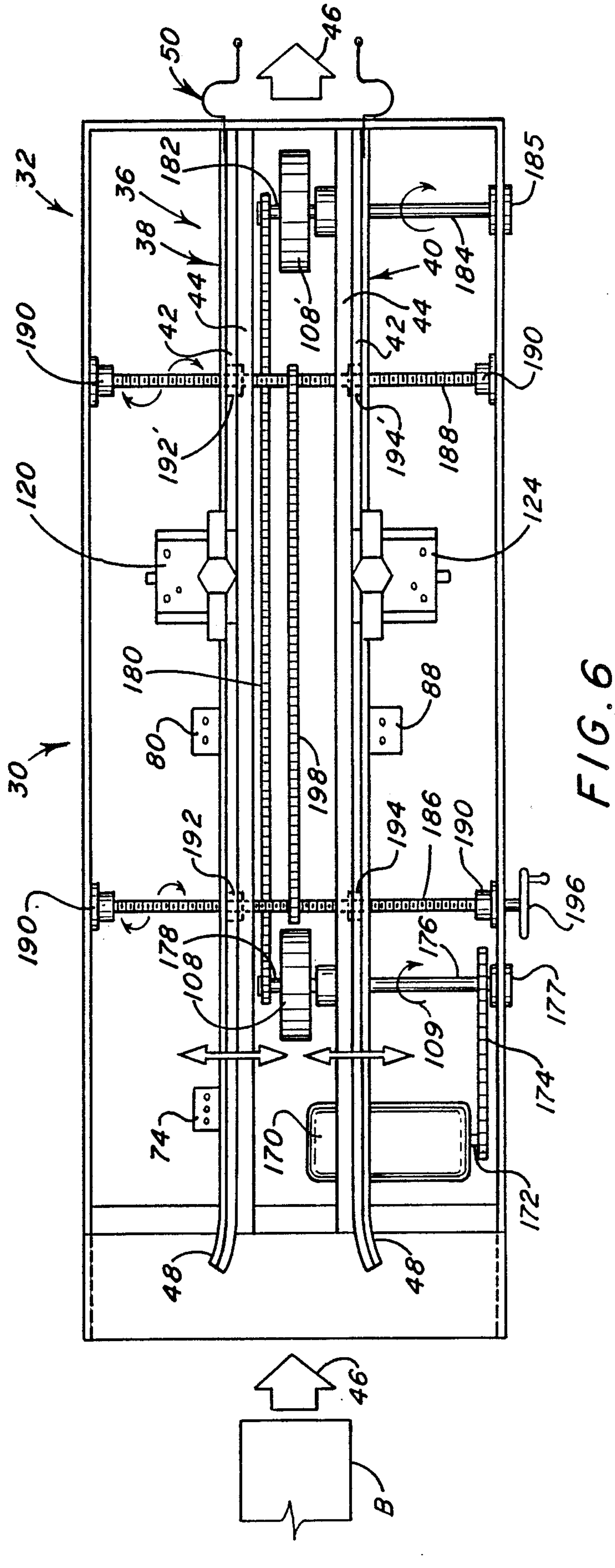
FIG. 6 is an illustration of the workpiece conveyor system and the adjustable workpiece guide frame of the present invention.

Referring now to FIG. 6, there can be seen details of the workpiece conveyor system and the adjustable guide frame 36 of the putty machine 30. The workpiece conveyor system includes a drive motor 170 for rotating an output shaft 172. Output shaft 172 has secured thereto a sprocket (not shown) for meshing with and driving a chain 174 which, in turn, drives a sprocket (not shown) secured to a second shaft 176. Shaft 176 is rotatably supported in frame 32 through a suitable pillow block 177 and has first drive wheel 108 fixedly secured thereto. Also fixedly secured to shaft 176 at a second end 178 thereof is a second sprocket (not shown). By this construction, it can be seen that rotation of shaft 176 in the direction of arrow 109 causes corresponding rotation of drive wheel 108 and the second sprocket. The second sprocket meshes with and drives a second chain 180 which drives a sprocket (not shown) secured to an end 182 of a third shaft 184. Third shaft 184 has second drive wheel 108' fixedly secured thereto and is rotatably supported in frame 32 through pillow block 185. Thus, drive motor 170 operates to simultaneously drive first and second drive wheels 108 and 108' to convey the boards "B" in the direction of arrows 46 through putty machine 30. It is also contemplated that the various chains and sprackets of the conveyor system may be replaced by suitable belts and pulleys if desired.

The operation and structure of the laterally adjustable guide frame 36 is as follows. As noted previously, each opposed guide member 38 and 40 of adjustable guide frame 36 includes a substantially vertical rail portion 42 having a substantially horizontal workpiece support portion 44 secured to the lower edge thereof. Each guide member 38 and 40 extends for substantially the entire length of frame 32. A pair of parallel threaded rods 186 and 188 extend transversely from one to the other side of frame 32 and are rotatably supported therein by pillow blocks 190. Rotation of threaded rods 186 and 188, as will be seen, causes guide members 38 and 40 to move toward or away from one another such that laterally adjustable guide frame 36 may accommodate boards of varying widths passing therethrough.

Secured to an undersurface of substantially horizontal workpiece support portion 44 of guide member 38 are a pair of longitudinally-spaced internally-threaded blocks 192 and 192'. Similarly secured to substantially horizontal support portion 44 of guide member 40 are a pair of longitudinally-spaced internally-threaded blocks 194 and 194'. Blocks 192 and 194 threadably receive threaded rod 186 and blocks 192' and 194' threadably receive threaded rod 188. Opposite halves of the threaded rods 186 and 188 are oppositely threaded. Therefore, blocks 192 and 192' are similarly threaded to receive the direction of threads of the "upper" halves of rods 186 and 188, while blocks 194 and 194' are similarly threaded to receive the direction of the threads of the "lower" halves of rods 186 and 188.

A first end of threaded rod 186 has fixedly secured thereto a manually rotatable adjustment wheel 196. Turning of wheel 196 turns rod 186. Near a central portion of rod 186 there is fixed a first sprocket (not shown). The first sprocket meshingly engages and drives a chain 198 which, in turn, drives a second sprocket (not shown) which is fixedly secured near a central portion of rod 188. Therefore, rotation of wheel 196, through the chain and sprocket connection between the threaded rods 186 and 188, simultaneously rotates the rods such that the guide members 38 and 40 are caused to move either toward or away from one another to accommodate boards of varying width. The guide members 38 and 40 are adjusted such that the putty applicator heads 120 and 124 just contact the side edges of the boards passing therethrough.

Figure 7A:
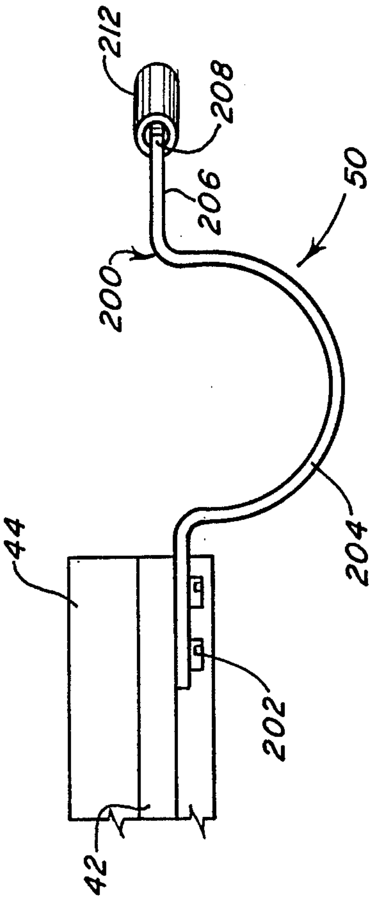
FIG. 7A is a view of the wiping means as seen along line A—A of FIG. 7.
Figure 7:
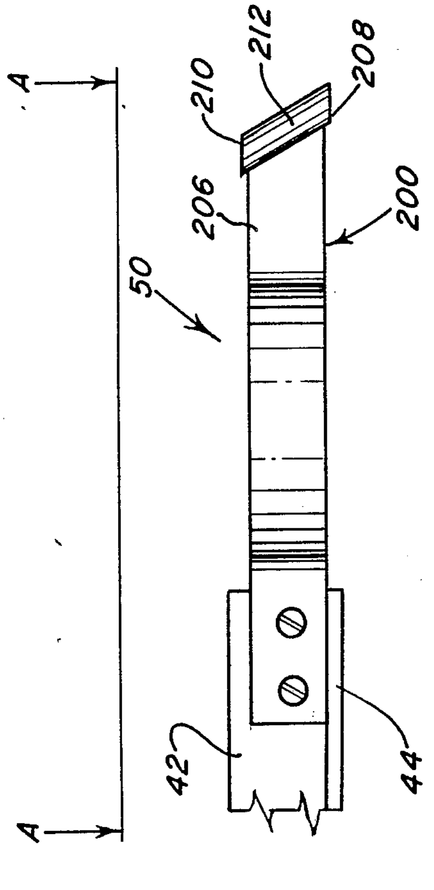
FIG. 7 is a view of the putty wiping means of the putty machine as seen along line VII—VII of FIG. 4.

FIGS. 7 and 7A show details of the excess putty striking or wiping means 50 positioned in recessed pocket 45 provided in guide member 40 immediately prior to second hold-down wheel 160 as depicted in FIG. 4. Similar wiping means 50 are also provided at the exit end of the vertical rail portion 42 of guide member 40. It is to be understood that the connection and structural details of the wiping means 50 attached to guide member 38 are mirror images of those shown in FIGS. 7 and 7A. It should be further appreciated that the wiping means 50 positioned immediately prior to the second hold-down wheel 160 may be eliminated, if desired, as is the case illustrated in FIG. 6.

Each wiping means 50 includes a bent metal strip member 200 having a flat portion which is secured by fasteners 202 to the end of rail portion 42 and, if desired, to block member 43 within recessed pocket 45. Outwardly extending from the end of rail portion 42 is a curved portion 204 of strip member 200. At the distal end of curved portion 204 is a second flat portion 206 and at the distal end of second flat portion 206 is an inwardly-hooked portion 208. The outermost or forwardmost edge of hooked portion 208 is formed as a downwardly and forwardly slanted striking edge portion 210. The angle of slant of striking edge portion 210 is generally on the order of 50° to 80° and preferably approximately 70 to the horizontal for maximum putty striking effectiveness.

Striking edge portion 210 of each strip member 200 by itself may be used to strike or wipe the excess putty applied to the side edge portions of the boards by putty applicator heads 120 and 124. However, it is preferred that a cylindrical steel member 212 be crimped to the hooked portion 208 of each strip member 200 of at least one pair of wiping means 50 if more than one pair of wiping means 50 are provided in putty machine 30, as in the preferred embodiment of FIG. 4, for example. And, in the preferred embodiment of FIG. 4, it is preferred that cylindrical steel members 212 be crimped only to the hooked portions 208 of the wiping means 50 positioned immediately prior to the second hold-down wheel 160 rather than on the hooked portions 208 of the wiping means 50 provided at the exit end of the vertical rail portions 42. Such an arrangement greatly reduces the amount of abrasive putty which is struck by the striking edge portions of the wiping means 50 provided at the end of the rails 42, thus extending their service life without the need for additional cylindrical members 212.

Furthermore, cylindrical steel members 212 are preferably crimped onto the wiping means 50 positioned at the exit end of the vertical rails 42 of the guide members 38 and 40 when only this pair of wiping means is present on the putty machine 30. Also, in any given opposed pair of wiping means 50 it is also possible to crimp a cylindrical steel member 212 onto only one of the strip members 200 forming the pair.

The outer circumferential wiping surface of each cylindrical member 212 ensures extremely smooth wiping of the side edges of the boards as they pass thereby. Due to the abrasiveness of the putty, the wiping surface of the cylindrical member quickly becomes worn. When this occurs, the cylindrical member 212 can be removed from hook member 208, inverted, and then recrimped onto the hook member. Thus, each cylindrical member 212 provides two wiping surfaces on its circumference for wiping the excess putty from the side edges of the boards. When both wiping surfaces of the cylindrical member become excessively worn, the member is simply replaced. It is suggested that the cylindrical members 212 be replaced in pairs.

As should now become apparent, the cylindrical members 212 provide means for wiping the excess putty from the side edges of the board and they also act to protect the knife edge portions 210 of the strip members 200 to thereby extend the life of the strip members. The force exerted by wiping means 50 on the side edges of the boards—such force directly controlling the ultimate thickness of the putty layer applied to the side edges of the boards—can be adjusted by merely bending the strip members inwardly toward each other or outwardly away from each other as desired. The wiping or striking means 50 thus described are a simple yet durable means for providing a smooth, consistent and controlled-thickness layer of putty along both side edges of the boards.

Figure 8:
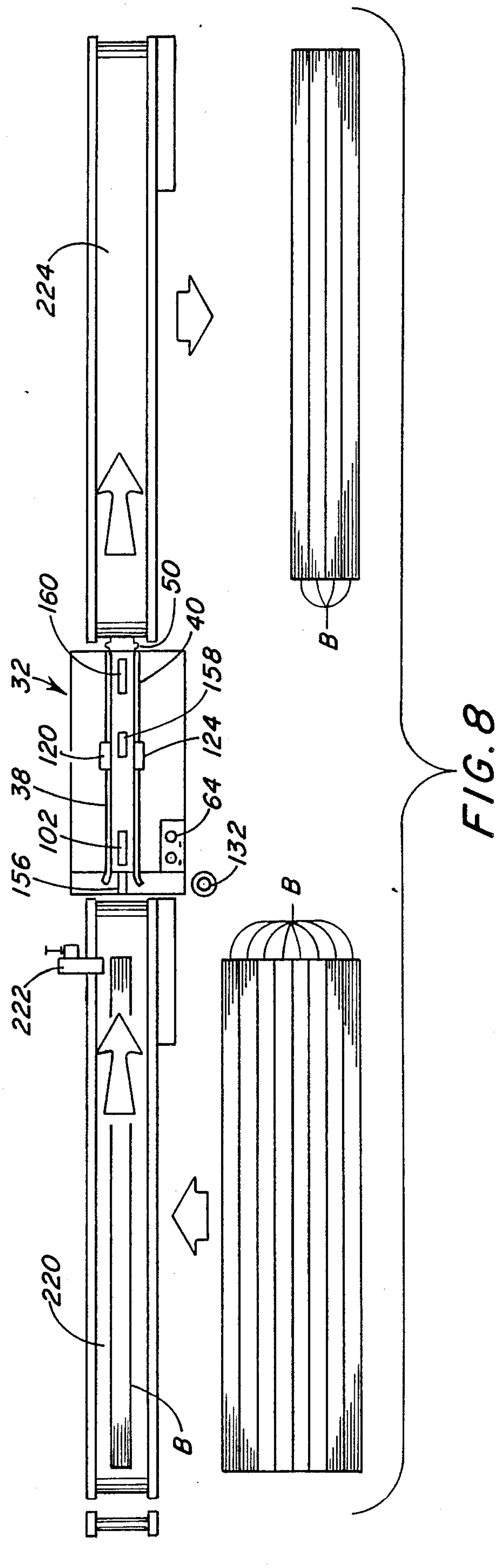
FIG. 8 is a schematic illustration showing the sequential puttying operation and general structural features of the puttying machine of the present invention.

In FIG. 8 there is shown a sequential operation of the putty machine 30. Untreated boards "B" are placed by an operator on a feed conveyor 220 and are cleaned by a dust blower 222·before they pass into the putty machine 30. After treatment in the putty machine, the boards are fed to a discharge conveyor 224 from which they are removed by personnel for drying. The treated boards are then stacked for further treatment such as sanding and/or painting if so desired.

From the foregoing, it can be appreciated that the present invention provides a unique automated putty machine for quickly, efficiently and completely puttying the side edges of large numbers of plywood boards rapidly and continuously in a mass production operation.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

We claim:

1. Apparatus for continuously puttying side edge portions of elongated workpieces, said apparatus comprising:

a main frame means;

workpiece guide frame means supported by and extending longitudinally of said main frame means;

means supported by said main frame means for conveying said workpieces along said workpiece guide frame means;

means for applying putty under pressure to substantially completely fill gaps and void spaces in at least one side edge of said elongated workpieces; and putty striking means supported independently of and downstream of said means for applying putty under pressure, said putty striking means including a putty striking surface for striking putty on said at least one side edge to provide a smooth, consistant and controlled-thinness layer of putty along said at least one side edge.

2. The apparatus of claim 1 further comprising means for maintaining positive contact between said workpieces and said means for conveying as said workpieces are conveyed along said guide frame means.

3. The apparatus of claim 2 wherein said means for maintaining positive contact comprise at least one workpiece hold-down means.

4. The apparatus of claim 1 wherein said workpiece guide frame means comprises a pair of opposed guide members for supporting and guiding said workpieces therebetween as said conveying means convey said workpieces therealong.

5. The apparatus of claim 4 further comprising means for adjusting the spacing between said guide members, said means for adjusting permitting said guide members to accommodate workpieces of variable width therebetween.

6. The apparatus of claim 5 wherein said means for applying putty under pressure comprise:

a putty reservoir;

putty applicator means supported by each of said guide members; and means for delivering putty under pressure from said putty reservoir to said putty applicator means.

7. The apparatus of claim 6 wherein said means for delivering putty under pressure comprise;

reciprocating pump means for pumping putty from said putty reservoir; and means associated with said pump means for compensating for unequal putty flow delivery rates associated with different strokes of said pump means and for delivering putty at substantially constant pressure and flow rate to said putty applicator means.

8. The apparatus of claim 6 wherein said means for applying putty under pressure are supported by said guide means opposite one and other for simultaneously applying putty under pressure to opposite side edges of said elongated workpieces.

9. The apparatus of claim 1 wherein said means associated with said pump means comprise accumulator means.

10. The apparatus of claim 9 further comprising switch means connected to said guide members and having switch arm means which are contacted and displaced by said workpieces during conveyance thereof along said guide members, said contact and displacement of said switch arm means by said workpieces causing said switch means to open valve means, said valve means, when opened, permit delivery of said putty from said accumulator means to said putty applicator means.

11. The apparatus of claim 10 pneumatic pressure supply means coupled to said valve means and said pump means for operations by pneumatic pressure.

12. The apparatus of claim 10 wherein said putty striking means comprise at least one pair of opposed strip members, one of each of said at least one pair of strip members being attached at a first end thereof to one of each of said pair of guide members, each said strip member having at a second end thereof an inwardly hooked portion, said putty striking surface comprising the distal end of said hooked portion having formed thereon a downwardly and forwardly slanted putty striking edge.

13. The apparatus of claim 12 wherein the inwardly hooked portion of at least one of said, opposed strip members forming said at least one pair has a cylindrical member crimped thereon, the outer circumferential surface of said cylindrical member forming at least one wiping surface for wiping excess putty from the side edge of the workpieces.

14. The apparatus of claim 12 wherein the inwardly hooked portion of each opposed strip member forming said at least one pair has a cylindrical member crimped thereon, the outer circumferential surface of said cylindrical member forming at least one wiping surface for wiping excess putty from the side edge of the workpieces.

15. The apparatus of claim 12 wherein said means for striking excess putty comprise first and second pairs of opposed strip members contacted in succession by said workpieces during conveyance thereof along said workpiece guide frame means, each of the opposed strip members forming said first pair has a cylindrical member crimped on the inwardly hooked portion thereof.

16. Apparatus for continuously puttying side edge portions of elongated workpieces, said apparatus comprising:

a main frame means;

workpiece guide frame means supported by and extending longitudinally of said main frame means;

means supported by said mainframe means for conveying said workpieces along said workpiece guide frame means;

a putty reservoir;

putty applicator means supported by each of said guide members for applying putty under pressure to at least one side edge of said elongated workpieces reciprocating pump means for delivering putty under pressure from said putty reservoir to said putty applicator means;

means associated with said pump means for compensating for unequal putty flow delivery rates associated with different strokes of said pump means and for delivering putty at substantially constant pressure and flow rate to said putty applicator means; and means associated with said workpiece guide frame means for striking excess putty applied to said at least one side edge by said means for applying putty under pressure whereby said means for applying putty under pressure in cooperation with said means for striking excess putty serve to substantially completely fill gaps and void spaces in said at least one side edge and further serve to provide a smooth, consistent and controlled-thickness layer of putty along said at least one side edge.

17. The apparatus of claim 16 wherein said means for applying putty under pressure are supported by said guide means opposite one another for simultaneously applying putty under pressure to opposite side edges of said elongated workpieces.

18. The apparatus of claim 16 wherein said means associated with said pump means comprise accumulator means.

19. The apparatus of claim 18 further comprising switch means connected to said guide members and having switch arm means which are contacted and displaced by said workpieces during conveyance thereof along said guide members, said contact and displacement of said switch arm means by said workpieces causing said switch means to open valve means, said valve means, when opened, permit delivery of said putty from said accumulator means to said putty applicator means.

20. The apparatus of claim 19 pneumatic pressure supply means coupled to said valve means and said pump means for operation by pneumatic pressure.

21. The apparatus of claim 19 wherein said means for striking excess putty comprise at least one pair of opposed strip members, one of each of said at least one pair of strip members being attached at a first end thereof to one of each of said pair of guide members, each said strip member having at a second end thereof an inwardly hooked portion, the distal end of said hooked portion having formed thereon a downwardly and forwardly slanted putty striking edge.

22. The apparatus of claim 21 wherein the inwardly hooked portions of at least one of said opposed strip members forming said at least one pair has a cylindrical member crimped thereon, the outer circumferential surface of said cylindrical member forming at least one wiping surface for wiping excess putty from the side edge of the workpieces.

23. The apparatus of claim 21 wherein the inwardly hooked portion of each opposed strip member forming said at least one pair has a cylindrical member crimped thereon, the outer circumferential surface of said cylindrical member forming at least one wiping surface for wiping excess putty from the side edge of the workpieces.

24. The apparatus of claim 21 wherein said means for striking excess putty comprises first and second pairs of opposed strip members contacted in succession by said workpieces during conveyance thereof along said workpiece guide frame means, each of the opposed strip members forming said firs pair has a cylindrical member crimped on the inwardly hooked portion thereof.

* * * * *